US007509589B2

(12) United States Patent
Hallisey et al.

(10) Patent No.: US 7,509,589 B2
(45) Date of Patent: Mar. 24, 2009

(54) STORAGE DOMAIN GUI

(75) Inventors: Brian Scott Hallisey, Fort Collins, CO (US); Peter Mark Maddocks, Windsor, CO (US); James Walter Wichelman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 446 days.

(21) Appl. No.: 10/673,834

(22) Filed: Sep. 30, 2003

(65) Prior Publication Data

US 2005/0071765 A1  Mar. 31, 2005

(51) Int. Cl.
G06F 3/048 (2006.01)
G06F 3/00 (2006.01)

(52) U.S. Cl. .................... 715/853; 715/735; 715/738; 707/205; 711/111; 711/221

(58) Field of Classification Search ................. 707/102, 707/204; 715/735, 738, 853; 711/111, 221
See application file for complete search history.

(56) References Cited

U.S. PATENT DOCUMENTS

| | | | | |
|---|---|---|---|---|
| 5,832,496 | A * | 11/1998 | Anand et al. ................ | 707/102 |
| 6,271,846 | B1 * | 8/2001 | Martinez et al. ............ | 715/854 |
| 6,671,776 | B1 * | 12/2003 | DeKoning ................... | 711/114 |
| 6,832,248 | B1 * | 12/2004 | Byrnes ........................ | 709/223 |
| 6,944,818 | B2 * | 9/2005 | Newman et al. ............ | 715/234 |
| 6,966,033 | B1 * | 11/2005 | Gasser et al. ............... | 715/738 |
| 6,976,212 | B2 * | 12/2005 | Newman et al. ............ | 715/227 |
| 6,996,587 | B2 * | 2/2006 | Wagener et al. ............ | 707/204 |
| 7,055,014 | B1 * | 5/2006 | Pawlowski et al. .......... | 711/202 |
| 7,165,096 | B2 * | 1/2007 | Soltis .......................... | 709/217 |
| 7,171,624 | B2 * | 1/2007 | Baldwin et al. ............. | 715/734 |
| 7,246,140 | B2 * | 7/2007 | Therrien et al. ............. | 707/202 |
| 7,263,593 | B2 * | 8/2007 | Honda et al. ................ | 711/205 |
| 2003/0179227 | A1 * | 9/2003 | Ahmad et al. ............... | 345/736 |
| 2003/0236790 | A1 * | 12/2003 | Honmura et al. ........... | 707/100 |
| 2004/0075680 | A1 * | 4/2004 | Grace et al. ................. | 345/734 |
| 2004/0085347 | A1 * | 5/2004 | Hagarty et al. ............. | 345/735 |
| 2004/0093361 | A1 * | 5/2004 | Therrien et al. ............. | 707/204 |
| 2004/0243616 | A1 * | 12/2004 | Benhase et al. ............ | 707/102 |
| 2004/0250043 | A1 * | 12/2004 | Ripberger et al. .......... | 711/206 |
| 2005/0021727 | A1 * | 1/2005 | Matsunami et al. ........ | 709/223 |
| 2005/0039123 | A1 * | 2/2005 | Kuchinsky et al. ......... | 715/526 |
| 2005/0066134 | A1 * | 3/2005 | Tormasov et al. .......... | 711/151 |
| 2005/0066293 | A1 * | 3/2005 | Hunt .......................... | 715/854 |
| 2008/0270608 | A1 * | 10/2008 | Matsunami et al. ........ | 709/225 |

OTHER PUBLICATIONS

EMC Inc. et al. "EMC SAN Product Description Guide" 2003.*
IBM et al. "Managed System for SAN storage users guide" 2001.*

* cited by examiner

Primary Examiner—Steven B Theriault

(57) ABSTRACT

A method generates a graphical portion of a graphical user interface (GUI), the graphical portion concerning aspects of a storage domain. Such a method may include: illustrating a tree hierarchy; including, on the tree hierarchy, a node at a first level corresponding to a set of at least two file systems that are members of the storage domain; and including, on the tree hierarchy, nodes at a second level reporting to the first-level node, each second-level node corresponding to a member of the set of files systems to which the first node corresponds. Related apparatus and machine-readable media having instructions can each include features similar to elements of the method.

33 Claims, 4 Drawing Sheets

FIG. 4

| User or Group | Quota Type | File Volume | Space Used (MB) | Soft Limit (MB) | Hard Limit (MB) | E-Mail |
|---|---|---|---|---|---|---|
| daemon | User | fv2 | 0 | 300 | 330 | daemon@hp.com |
| spop | User | fv1 | 0 | 300 | 330 | spop@hp.com |
| admin | User | fv1 | 0 | 200 | 220 | admin@hp.com |
| daemon | User | fv1 | 0 | 100 | 110 | daemon@hp.com |
| tape:26 | Group | fv2 | 0 | 500 | 550 | tape@hp.com |
| tty:5 | Group | fv2 | 0 | 600 | 660 | tty@hp.com |
| tty:5 | Group | fv1 | 0 | 400 | 440 | tty@hp.com |

STORAGE DOMAIN GUI

BACKGROUND OF THE INVENTION

Graphical user interfaces (GUIs) that use a tree-table are known, as are certain variations. One such variation is a GUI that uses a two-pane tree & table combination.

A known manager application used with a storage domain has a GUI that illustrates information about the provider(s) of storage, e.g., a network-attached storage (NAS) device and its relationships to the storage domain using a two-pane tree & table combination GUI. A tree hierarchy is illustrated in one of the panes and a corresponding table is illustrated in the other pane.

The known NAS manager GUI shows, at a first level of the tree-hierarchy, a first-category node corresponding to the group of all file systems (file volumes) mounted on the NAS device. An example of two file systems can be the logical c:-drive and the logical d:-drive on a computer. No node representing a single file-system/member-of-the-group is illustrated in the tree hierarchy. Also shown in the tree hierarchy are: a second node-category, at the first level, corresponding to all allotments of storage space on the NAS device; and two nodes at a second level reporting to the all-allotments node, one of which represents all instances of individual storage consumers, the other of which represents all instances of groups of storage consumers. No node representing a single instance of storage-consumer, nor a single instance of a group of storage consumers, is illustrated in the tree hierarchy.

SUMMARY OF THE INVENTION

An embodiment of the invention is directed toward a method of generating a graphical portion of a graphical user interface (GUI), the graphical portion concerning aspects of a storage domain. Such a method may include: illustrating a tree hierarchy; including, on the tree hierarchy, a node at a first level corresponding to a set of at least two file systems that are members of the storage domain; and including, on the tree hierarchy, nodes at a second level reporting to the first-level node, each second-level node corresponding to a member of the set of files systems to which the first node corresponds.

Other embodiments of the invention include related apparatus and machine-readable media having instructions, each of which may include features similar to elements of the method.

Additional features and advantages of the invention will be more fully apparent from the following detailed description of example embodiments and the accompanying drawings.

BRIEF DESCRIPTION OF THE DRAWINGS

The drawings are: intended to depict example embodiments of the invention and should not be interpreted to limit the scope thereof.

And FIG. 4 depicts another graphical portion according to an embodiment of the invention and corresponding to the graphical portion of FIG. 2.

DETAILED DESCRIPTION OF EXAMPLE EMBODIMENTS

Figure 1:
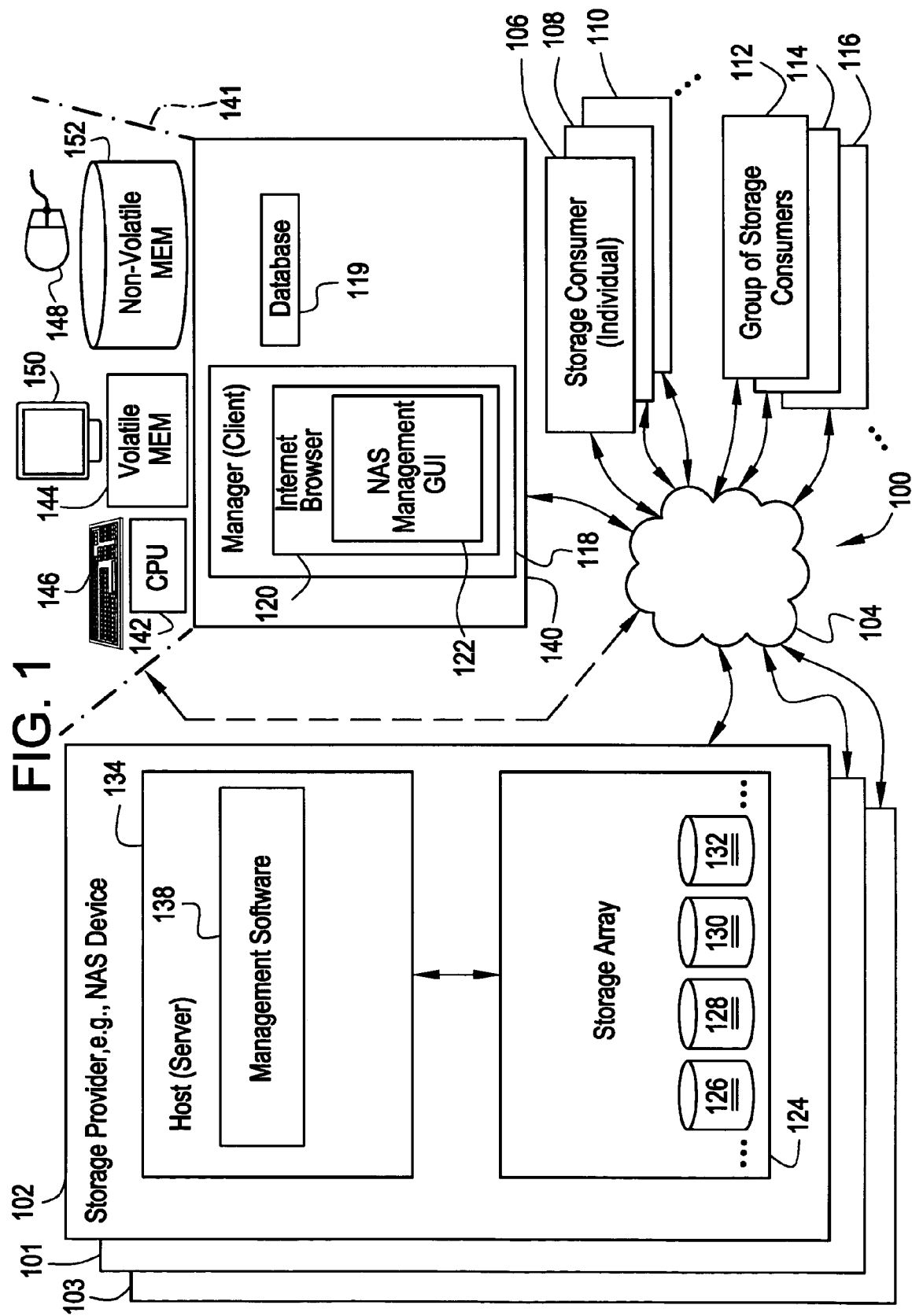
FIG. 1 is an architecture diagram of a storage domain according to an embodiment of the invention.

FIG. 1 is an architecture diagram of a distributed system 100, e.g., a storage domain. In the context of a storage-domain, e.g., 100, use can be made of a graphical user interface (GUI) according to an embodiment of the invention.

Components of the storage domain 100 can include: one or more providers 102 (and optionally, 101, 103, etc.) of storage capacity; a manager 118 of the NAS-device 102 (hereafter, the "NAS-manager 118"); various individual consumers of storage 106, 108, 110, etc.; and various groups of storage consumers 112, 114, 116, etc.; and a networking protocol and/or architecture (NPA) 104 through which the components 102, 106-118 can communicate. A storage provider such as 102 can be, e.g., a network-attached storage (NAS) device.

The storage-consumers 106-116 are consumers in the sense that they consume storage capacity made available to them through the storage domain 100. The storage-providers 101-103 are providers of storage capacity to the storage domain 100. Particular collections of storage-domain components vary according to circumstances in which the storage-domain is assembled and evolves. Thus, the storage domain 100 can include additional storage consumers and/or additional providers of storage.

In general operation of the storage domain 100, the storage consumers 106-116 are allotted respective amounts of storage capacity (made available by the storage-providers 101-103) on the storage-domain 100. The provisioning, allotment and control over (including access to) the storage capacity (more generally, the management thereof is performed via the NAS-manager 118. Also, where permitted by the NAS-manager 118, the storage consumers 106-116 can conduct writes/reads directly (in the sense of not needing the involvement of the NAS-manager 118) to/from the NAS-device 102 via the NPA 104.

As will be described below, the NAS-manager 118 makes use of a GUI according to an embodiment of the invention, thus making the NAS-manager 118 another embodiment of the invention. A graphical portion of such a GUI can, e.g., enhance a user's ability to manage the storage made available by the NAS-device 102 various storage-domain components. An example of a NAS device (and its associated management software including the components external to the NAS device) that can be adapted according to the description provided below (and so represent an embodiment of the invention) is the Hewlett-Packard Company brand NAS8000 model of NAS-device.

Typically, the NAS-manager 118 is an application loaded on a host 140 (shown as an exploded view 141 with phantom lines) that is connected to the NPA 104. In general, a host is a computer that can provide/receive data and/or services via an NPA, e.g., 104. Typical components found in the host 140 include: a central processing unit (CPU) 142; volatile memory 144; non-volatile memory 152; a keyboard 146; a pointing device, e.g., a mouse, 148; and a monitor 150.

The NAS manager 118 can generate a GUI 122 based upon the GUI according to an embodiment of the invention, as briefly noted above. The GUI 122 can be a plug-in to an internet browser 120. The NAS device 102 can include a host 134 and a storage array 124 of various individual storage units 126-132, etc., e.g., hard disk drives. The NAS host 134 can include components similar to those of the host 140. Management software 138, which interacts with the NAS-manager 118, can be loaded on the host 134. The NAS-manager 118 and the host/management_software 134/138 can be based upon a client-server architecture, respectively.

An embodiment, at least in part, of the invention is the recognition of the following. Storage domains typically have multiple file systems on which multiple users/groups have amounts of storage space allotted, respectively. In the storage-domain context, it can be desirable to view: a tree-hierarchy depicting a parent node corresponding to all file systems of the storage domain and child nodes thereof corresponding to instances of the files systems; and/or the space allotments across two or more files systems for all of the users and/or groups in one table. The known NAS manager GUI of the Background Art does not provide such capability. As to the latter, the known NAS manager GUI provides a table for a single file system and representing the associated users or groups, but not both users and groups.

Figure 2:
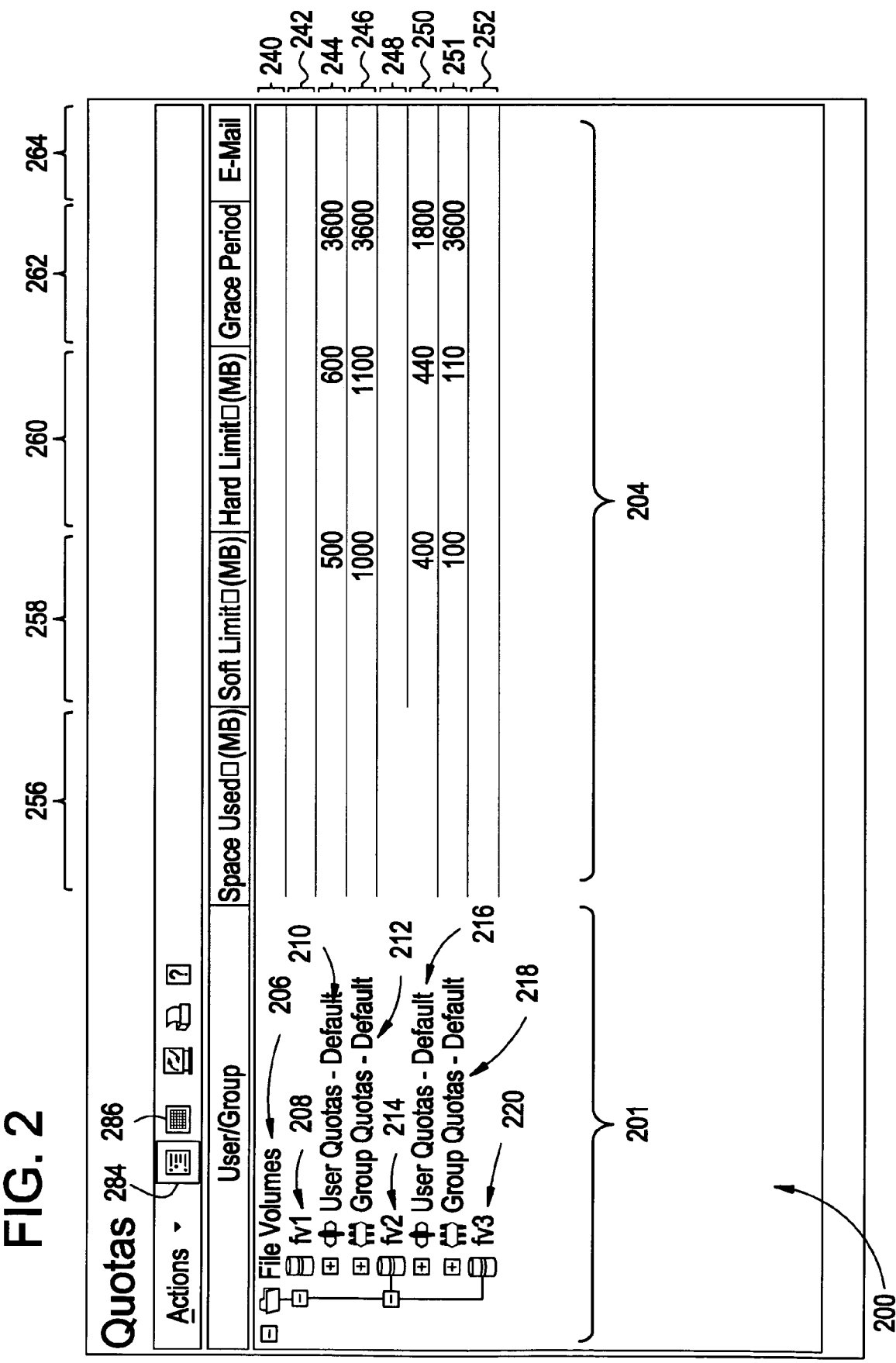
FIG. 2 depicts a graphical portion of a graphical user interface (GUI) according to an embodiment of the invention in the context of an example circumstance in which use of the GUI can arise.

FIG. 2 depicts a graphical portion 200 of a graphical user interface (GUI) according to an embodiment of the invention (hereafter, the "present GUI") in the context of an example circumstance in which use of the present GUI can arise, which in FIG. 2 is the context of a storage domain, e.g., 100. The graphical portion 200 can be depicted, e.g., on a display screen (e.g., 150). The NAS-manager 118 can produce the present GUI, e.g., via the CPU 142, etc. generating the graphical portion 200.

For ease of discussion, the graphical portion 200 is couched in the example circumstances of a storage-domain 100 having particular albeit fictitious storage-domain components that exhibit particular albeit (again) fictitious attributes. Hence, the graphical portion 200 has been illustrated with particular examples of labels for nodes, particular examples of attributes, and example values for the attributes. It should be understood that such labels, attributes and values will differ depending upon the circumstances in which use of the present GUI arises.

The graphical portion 200 is a tree-table that includes a portion illustrating a tree hierarchy 201 and a second illustrating a table 204. The following description addresses the tree-hierarchy portion 201 and then (further below) the table portion 204.

A database 119, e.g., an SQL database loaded on the host 132, maintains information about the storage-domain 100 and the various storage-domain components. The tree hierarchy 201 can be represented in the database 119, or alternatively in the NAS-manager 118, as lists of data objects corresponding to the storage-domain 100 and the various storage-domain components. For example, each node in the tree hierarchy 201 can be represented as a list including data objects that represent all of its child nodes, respectively.

The tree hierarchy 201 includes: a node 206 at a first level; nodes 208, 214 and 220 at second level; and nodes 210, 212, 216 and 218 at a third level. The second-level nodes 208, 214 and 220 report to the first-level node 206. The third-level nodes 210 and 212 report to the second-level node 208. The third-level nodes 216 and 218 report to the second-level node 214.

The present GUI constructs the tree-hierarchy 201 out of the nodes 206-220 in a manner similar to how folders and files are used to construct the known two-pane tree & table combination type of GUI found in the Windows® Explorer® model of file browser made available by the Microsoft® Corporation. Hence, the present GUI can be an adaptation of the Windows® Explorer®-type GUI.

Again, for the sake of example, the nodes in FIG. 2 have been given the following specific labels relevant to the context of the storage-domain example.

| Node # | Label |
|--------|-------|
| 206 | File_Volumes |
| 208 | fv1 |
| 210 | User_Quotas - Default |
| 212 | Group_Quotas - Default |
| 214 | fv2 |
| 216 | User_Quotas - Default |
| 218 | Group_Quotas - Default |
| 220 | fv3 |

The File_Volumes node 206 corresponds to the set of all file systems (also known as file volumes) in the storage domain, e.g., mounted on the NAS-device 102. Each of the fv1 node 208, the fv2 node 214 and the fv3 node 220 corresponds to an instance of a file system, i.e., to a member of the set to which the File_Volumes node 206 corresponds.

A file system has its own directory structure, and that directory structure has its own unique root. For example, a computer or host having a logical c:-drive and a logical d:-drive (e.g., on the same physical storage unit) can be said to have two separate file systems. Different operating systems have different file-system types, e.g., the Windows® brand of operating systems includes the NTFS and FAT types of file systems, the LINUX variety of operating system includes the XFS type of file system, etc. In the storage domain 100, there are multiple file systems that can be of the same and/or different type.

The nodes 210 and 216 correspond to a set of instances of storage consumers, examples of such instances being 106-110. The nodes 212 and 218 correspond to a set of groups of storages consumers, examples of such groups being 112-116.

Each of the nodes 206-220 is analogous to a folder in the Windows® Explorer®-type GUI. As such, each is expandable, as indicated by the adjacent expand button taking the form of the icon . Expanding any one of the nodes 210, 212, 216 and 218 can reveal fourth-level nodes analogous to files in the Windows® Explorer®-type GUI that correspond to one or members of the set to which the parent third-level node corresponds, assuming that a member exists. Such fourth-level nodes are depicted in FIG. 3.

Figure 3:
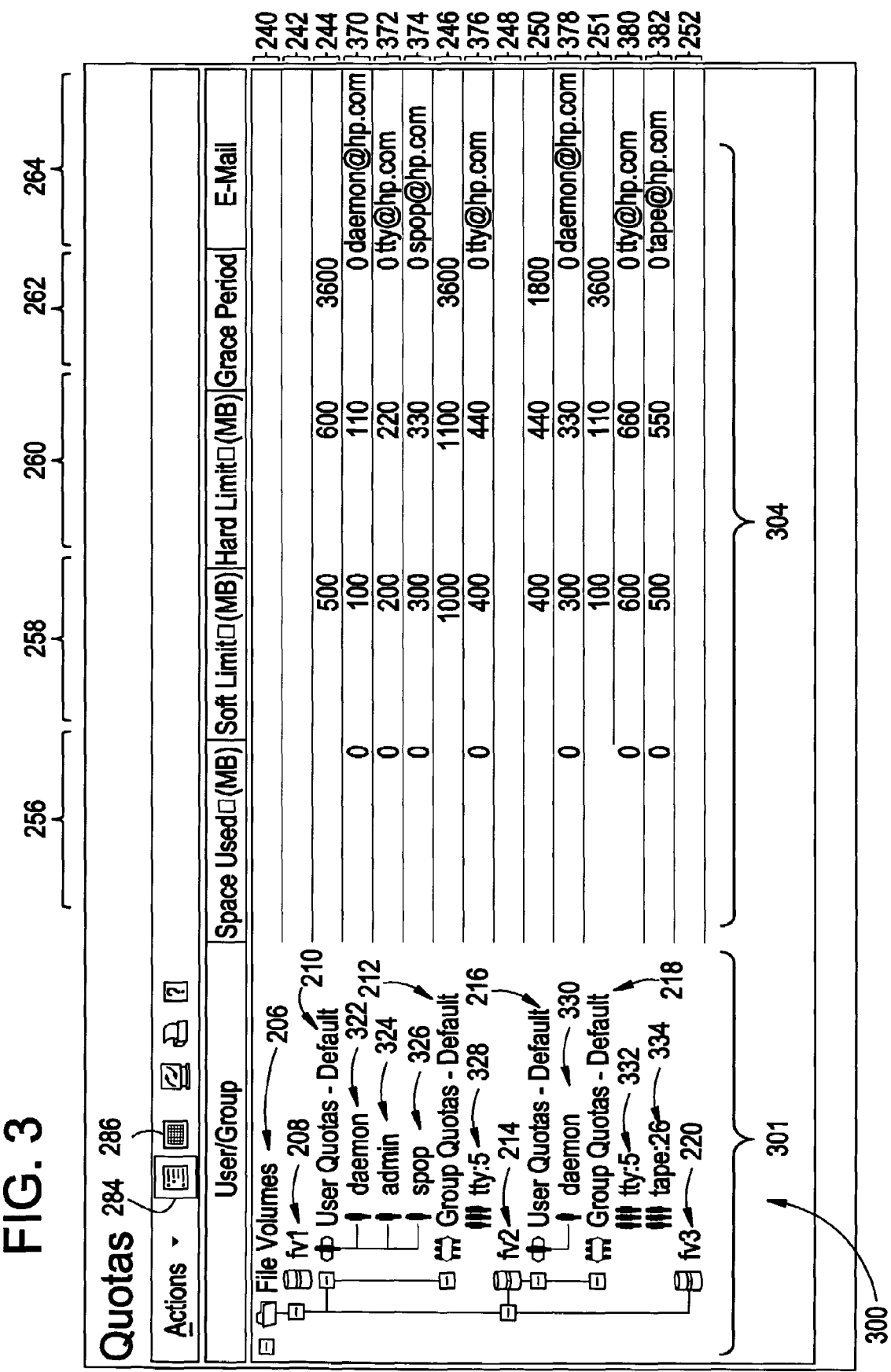
FIG. 3 depicts a variation on the graphical portion of FIG. 2.

FIG. 3 depicts a variation 300 of the graphical portion 200 of FIG. 2 for the circumstance in which the nodes 210, 212, 216 and 218 have been expanded (making each collapsible, as indicated by the adjacent collapse button taking the form of the icon ). Item numbers have been used in FIG. 3 a manner corresponding to FIG. 2, hence a generalized discussion of FIG. 3 is not provided, for brevity.

The tree hierarchy 301 further includes: nodes 322-334 at the forth level. The fourth-level nodes 322-326 report to the third-level node 210. The fourth-level node 328 reports to the third-level node 212. The fourth-level node 330 reports to the third-level node 216. And the fourth-level nodes 332-334 report to the third-level node 218.

Similarly, for the sake of example, the nodes in FIG. 3 have been given the following specific labels relevant to the context of the storage-domain example.

| Node # | Label |
|---|---|
| 322 | daemon |
| 324 | admin |
| 326 | spop |
| 328 | tty:5 |
| 330 | daemon |
| 332 | tty:5 |
| 334 | tape:26 |

In keeping with the analogy to the Windows® Explorer®-type GUI, the File_Volumes node 206 has been depicted with a folder icon . Though analogous in behavior to a folder, the nodes 208, 214 and 218 corresponding to instances of file systems (again, of the same and/or different file-system-type) have been depicted with the  icon (resembling a cylinder), the nodes 210 and 216 have been depicted with the  icon (resembling the silhouette of a person in front of a horizontal arrow), and the nodes 212 and 218 have been depicted with the  icon (resembling the silhouette of three people in front of a horizontal arrow). Though analogous in behavior to a file, the nodes 322-326 and 330 have been depicted with the  icon (resembling the silhouette of a person), and the nodes 328 and 332-334 have been depicted with the  icon (resembling the silhouette of three people).

The node 322 ("daemon") and the node 330 ("daemon") report to different file systems, namely, fv1 (node 208) and fv2 (node 214), respectively. Yet nodes 322 and 330 can correspond to the same user. In other words, the entity to which a fourth-level node corresponds can report indirectly to two or more file systems (to which respective second-level nodes correspond).

The table 204 will now be discussed in more detail. The table is adaptively arranged to provide a row corresponding to each of the nodes currently displayed in the tree hierarchy 201. As noted above, many of the nodes in the tree hierarchy are expandable/collapsible, which can vary the nodes which are currently displayed. The number of rows illustrated in the table 204 is adaptively arranged in response to the respective states (expanded vs. collapsed) of the expandable/collapsible nodes. Also, the number of storage consumers and groups of storage-consumers and/or file systems can vary, hence the table 204 is also adaptively arranged relative to such changes.

In FIG. 2, the table 204 includes rows 240-252 associated (and aligned with) the nodes 206-220, respectively. In FIG. 3, the table 304 further includes rows 370-382 associated (and aligned with) the nodes 322-334, respectively.

In general, a second-level node, e.g., 208, will have at least one third-level node, e.g., 210 or 212 as long as quotas/limits are imposed upon storage-consumers that consume space upon it. If quotas/limits are not imposed, then the second-level node would not have a child node, as is the case with the fv3 node 220.

The tables 204 and 304 include columns 256-264 that show attributes of the respective nodes. The rows of the tables 204 and 304 include cells corresponding to the columns 256-264. Relative to the nodes 322-334, the columns show the following. The attribute of column 256 can be an amount of space consumed/used by the associated user/group on the respective file system. The attribute of column 258 can be a soft limit on the amount of storage space made available to the associated user/group. A soft limit is the quota, or amount of storage space, that the administrator of the storage domain 100 wishes to enforce upon the associated user/group. Column 260 shows a hard limit on the amount of storage space made available to the associated user/group. A hard limit is the maximum amount of storage space that the administrator will permit the associated user/group to consume.

The attribute of column 262 can be a size of a grace period in which the soft limit can be exceeded by the associated user/group. A grace period is an amount of time that the administrator will permit the soft limit to be exceeded. The grace period addresses the situation in which the soft limit was not exceeded before starting a data-writing operation but is exceeded at some point after the data-writing operation has begun. The understanding is that the user/group should delete data in due course after the data-writing operation has completed in order to get his value of storage-consumed/used back to being below the soft limit. If the user/group does not get below the soft limit within the grace period, no further data writing is permitted until the user/group gets below the soft limit. Dropping below the soft limit can reset the grace period to the full amount.

Even if the grace period has not been exceeded, no data-writing operation is permitted to consume more than the hard limit. Rather, the data-writing operation would be failed at the point of exceeding the hard limit.

Relative to the nodes 210, 212, 216 and 218, the columns show default values for the attributes. Column 264 can indicate contact information, e.g., an email address, to which notice of exceeding a limit can be sent.

In view of being arranged according to the nodes of the tree-hierarchy 201/301, the tables 204/304 cannot be sorted on the basis of an attribute to which a column corresponds. Should that be desired, the user can toggle the present GUI to illustrate a corresponding sortable table in replacement of the graphic portion 200/300. Toggling can be achieved by selecting the button for a tree-table view (depicted with the icon  resembling a tree-table) or for a selectable-table view (depicted with the icon  resembling a table). The present GUI can keep the two views synchronized with respect to each other, e.g., such that the highlighted item in one view remains highlighted in the toggled view.

A result of such toggling is shown in FIG. 4, which depicts a graphical portion 400 according to another embodiment of the invention. The graphical portion 400 is a table (hereafter the "sortable table 400") sortable on the basis of an attribute to which a column corresponds. In the example of FIG. 4, the sortable table 400 corresponds to the table 304.

Also in the example of FIG. 4, in addition to the columns present in the tables 204/304, the table 400 further includes columns 488-492. The attribute of column 488 can be the label of the node with which the row is associated. The attribute of column 490 can be the type of quota associated with the row, which also is the type of entity (user or group) associated with the row. The attribute of column 492 can be the label of the file system (file volume) on which the associated user/group has been allotted storage space.

In contrast to the tables 204/304, the sortable table 400 does not show the rows 240-252. Alternatively, other combinations of rows can be shown, e.g., additionally showing the rows 244, 246, 250 and 251.

In particular, the sortable table 400 has been sorted according to the Quota_Type column 490. Within the sort results, a secondary sort can be exhibited, e.g., alphabetically with respect to user/group name.

The differences between example FIG. 2 and FIG. 3 reveal how the present GUI facilitates a user's drilling down from a broad view to a specific view, which can make relationships between file systems, default values for various attributes, currently exhibited values of various attributes, etc., easier to comprehend. Similarly, the ability to do attribute-based sorting of such relationships facilitates their comprehension.

The relative sequence, left to right, or vice-versa, of the columns in the tables 204, 304 and 400 can be rearranged by dragging and dropping the bar illustrating the column heading in a manner similar to the Windows® Explorer®-type GUI.

The expanse of the graphic portions 200, 300, 400 could exceed the boundaries of the panes in which they are illustrated. If so, the GUI can automatically provide vertical and/or horizontal scroll bars as needed.

As is apparent from the foregoing, embodiments of the invention can take the form of methods, software and computers adapted to run such software and/or methods. The software can be offered to the user in the form of a computer-readable storage medium. The storage medium may be a built-in medium installed inside a computer main body or removable medium arranged so that it can be separated from the computer main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

The invention being thus described, it will be obvious that the same may be varied in many ways. Such variations are not to be regarded as a departure from the spirit and scope of the invention, and all such modifications are intended to be included within the scope of the invention.

We claim:

1. A method of generating a graphical portion of a graphical user interface (GUI), the graphical portion concerning aspects of a storage domain, the method comprising:
   illustrating a tree hierarchy and a table portion as a tree-table view;
   including, on the tree hierarchy, a node at a first level corresponding to a set of at least two different file systems that are simultaneously displayed and members of the storage domain;
   including, on the tree hierarchy, nodes representing users and groups having allocated storage at a second level reporting to the first-level node, each second-level node corresponding to a member of the set of files systems to which the first node corresponds;
   including, on the tree hierarchy, nodes at a third level, each third-level node corresponding to storage consumers having allocated storage capacity on the storage domain;
   simultaneously displaying, on the table portion, the allocated storage capacity used by the storage consumers of the at least two different file systems; and
   toggling between the tree-table view and a table view that shows the storage domain in a table that can be sorted based on attributes to which a column of the table belongs, wherein the storage domain includes a network-attached storage (NAS) device on which the at least two different file systems are mounted.

2. The method of claim 1, wherein each second-level node being a parent to at least one of the third-level nodes.

3. The method of claim 1, wherein each third-level node corresponds to one of an individual consumer or group of consumers using storage capacity on the storage domain.

4. The method of claim 1, further comprising:
   including, on the tree hierarchy, nodes at a fourth level; wherein
   each third-level node is a parent to at least one fourth-level node;
   each third-level node corresponds to one of a set of instances of storage-consumers and a set of groups of storage-consumers, each group corresponding to instances of storage-consumers, respectively; and
   each fourth-level node corresponds to a member of the set to which the parent third-level node corresponds.

5. The method of claim 4, wherein two or more fourth-level nodes correspond to the same entity yet and report indirectly to two or more second-level nodes representing respective file systems.

6. The method of claim 1, further comprising:
   changing a number of rows in the table portion in response to expanding or collapsing the nodes at the second and third levels in order to show a row corresponding to each node currently displayed in the tree hierarchy.

7. A method of generating a graphical portion of a graphical user interface (GUI), the method comprising:
   illustrating a tree-table view having a tree hierarchy portion and a table portion;
   including, on the tree-hierarchy portion, nodes representing users and groups having allocated storage corresponding to storage consumers that are members of different file systems having allocated storage capacity on a storage domain;
   including, on the table-portion, rows and one or more columns,
      the one-or-more columns each representing an attribute, respectively, regarding an allotment of storage space to the respective storage consumers, and
      each row being aligned with one of the nodes, respectively, and including cells corresponding to the one or more columns;
   simultaneously displaying on the table-portion the allotment of storage space for storage consumers of the different file systems; and
   toggling, in response to a user request, between the tree-table view and a sortable table that corresponds to the table-portion, wherein the storage domain includes a network-attached storage (NAS) device on which the different file systems are mounted.

8. The method of claim 7, wherein the attribute is one of:
   a soft limit on storage space;
   a hard limit on storage space; and
   a currently-consumed amount of storage space.

9. The method of claim 8, wherein:
   the attribute is a first attribute;
   the first attribute is the soft limit: and
   the method further comprises
      including, on the table-portion, another colunm representing a second attribute, the second attribute being a size of a grace period in which the soft limit can exceeded.

10. The method of claim 7, wherein the tree-table view and the sortable table are synchronized with respect to each other.

11. The method of claim 10, wherein the sortable table includes all of the rows and the one-or-more columns of the table-portion.

12. The method of claim 7, further comprising:
   selecting an icon on the GUI to toggle between the tree-table view and the sortable table.

13. The method of claim 7, further comprising:
   changing a number of rows in the table portion in response to expanding or collapsing the nodes corresponding to the storage consumers in order to show a row corresponding to each node currently displayed in the tree hierarchy.

14. A method of generating a graphical portion of a graphical user interface (GUI), the method comprising:

illustrating a tree-table having a tree hierarchy portion and a table portion;

including, on the tree-hierarchy portion, two different file systems, with each of the file systems simultaneously displayed with a node at a first level corresponding to one file system in a storage domain;

including, at a second level on the tree-hierarchy portion, at least one of a node belonging to a first node-category corresponding to a set of users of storage-consumers that are allocated storage space on the storage domain, and a node belonging to a second node-category corresponding to a set of groups of storage-consumers that are allocated storage space on the storage domain, each second-level node reporting to the first-level node;

including, on the table-portion, rows and one or more columns, the one-or-more columns each representing an attribute, respectively, regarding an allotment of storage space to the respective storage consumers, and the rows being aligned with the first-category and second-category nodes, respectively, and including cells corresponding to the one or more columns;

simultaneously displaying on the table portion the allotment of storage space for storage consumers of the two different file systems; and toggling, in response to a user request, between the tree-table and a sortable table that corresponds to the table-portion, wherein the storage domain includes a network-attached storage (NAS) device on which the two different file systems are mounted.

15. The method of claim 14, further comprising:

including, on the tree-hierarchy portion, nodes at a third level that report to the first-category and second-category nodes, respectively, each third-level node corresponding to a member of the set to which the parent first-category or second-category node corresponds, respectively; and including, on the table-portion, rows that align with the third-level nodes, respectively, and include cells corresponding to the one or more columns.

16. The method of claim 15, further comprising:

including, on the tree-hierarchy portion, at least two first-level nodes corresponding to at least two files system in the storage domain; and including, on the tree-hierarchy portion, a node at a zeroith level representing all instances of file systems in the storage domain, the zeroith-level node being the parent to each of the first-level nodes.

17. The method of claim 14, wherein the tree-table and the sortable table are synchronized such that a highlighted item remains highlighted in both the tree-table and the sortable table.

18. A computer readable storage medium having instructions for causing a computer to execute a method, comprising:

illustrating a tree hierarchy and a table portion as a tree-table view;

including, on the tree hierarchy, a node at a first level corresponding to a set of at least two different file systems that are simultaneously displayed and members of a storage domain;

including, on the tree hierarchy, nodes at a second level reporting to the first-level node, each second-level node corresponding to a member of the set of files systems to which the first node corresponds;

including, on the tree hierarchy, nodes at a third level, each third-level node corresponding to storage consumers and groups having allocated storage capacity on the storage domain;

simultaneously displaying, on the table portion, the allocated storage capacity used by the storage consumers of the at least two different file systems; and toggling between the tree-table view and a table view that shows the storage domain in a table that can be sorted based on attributes to which a column of the table belongs, wherein the storage domain includes a network-attached storage (NAS) device on which the at least two different file systems are mounted.

19. The computer readable storage medium of claim 18, wherein the tree-table view and the sortable table are synchronized with respect to each other.

20. The computer readable storage medium of claim 18, further comprising:

changing a number of rows in the table portion in response to expanding or collapsing the nodes at the second and third levels in order to show a row corresponding to each node currently displayed in the tree hierarchy.

21. A computer readable storage medium having instructions for causing a computer to execute a method, comprising:

illustrating a tree-table having a tree hierarchy portion and a table portion;

including, on the tree-hierarchy portion, nodes corresponding to storage consumers and groups that are members of different file systems having allocated storage capacity on a storage domain;

including, on the table-portion, rows and one or more columns, the one-or-more columns each representing an attribute, respectively, regarding an allotment of storage space to the respective storage consumers, and each row being aligned with one of the nodes, respectively, and including cells corresponding to the one or more columns;

simultaneously displaying on the table-portion the allotment of storage space for storage consumers of the different file systems; and toggling, in response to a user request, between the tree-table and a sortable table that corresponds to the table-portion, wherein the storage domain includes a network-attached storage (NAS) device on which the two different file systems are mounted.

22. The computer readable storage medium of claim 21, wherein the attribute is one of:

a soft limit on storage space;

a hard limit on storage space; and a currently-consumed amount of storage space.

23. The computer readable storage medium of claim 22, wherein:

the attribute is a first attribute;

the first attribute is the soft limit; and further comprising including, on the table-portion, another column representing a second attribute, the second attribute being a size of a grace period in which the soft limit can exceeded.

24. The computer readable storage medium of claim 21, further comprising:
selecting an icon on a graphical user interface (GUI) to toggle between the tree-table and the sortable table.

25. The computer readable storage medium of claim 21, wherein the tree-table and the sortable table are synchronized so a highlighted items remains highlighted after toggling between the tree-table and the sortable table.

26. The computer readable storage medium of claim 21 further comprising:
changing a number of rows in the table portion in response to expanding or collapsing the nodes corresponding to the storage consumers in order to show a row corresponding to each node currently displayed in the tree hierarchy.

27. An apparatus for managing aspects of a storage domain, the apparatus comprising:
a host operatively connected to components of the storage domain; and
manager means for running on the host and for managing aspects of the storage domain in part by producing a graphical user interface (GUI); and
generation means for generating a graphical portion of the GUI, the generation means being operable to:
portray, in the graphical portion, a tree hierarchy and a table portion,
portray, on the tree hierarchy, a node at a first level corresponding to a set of at least two different file systems that are simultaneously displayed and members of the storage domain,
portray, on the tree hierarchy, nodes at a second level reporting to the first-level node, each second-level node corresponding to a member of the set of files systems to which the first node corresponds,
portray, on the tree hierarchy, nodes at a third level, the third-level node representing users and groups having having allocated storage capacity on the storage domain,
simultaneously portray, on the table portion, the allocated storage capacity used by the users and groups of the displayed different file systems, and
toggle, in response to a user request, between the tree-table and a sortable table that corresponds to the table-portion, wherein the storage domain includes a network-attached storage (NAS) device on which the at least two different file systems are mounted.

28. The apparatus of claim 27, wherein each second-level node being a parent to at least one of the third-level nodes.

29. The apparatus of claim 27, wherein the generation means is further operable to change a number of rows in the table portion in response to expanding or collapsing the nodes at the second and third levels in order to show a row corresponding to each node currently displayed in the tree hierarchy.

30. An apparatus for managing aspects of a storage domain, the apparatus comprising:
a host operatively connected to components of the storage domain; and
manager means for running on the host and for managing aspects of the storage domain in part by producing a graphical user interface (GUI); and
generation means for generating a graphical portion of the GUI, the generation means being operable to:
portray, in the graphical portion, a tree-table having a tree hierarchy portion and a table portion,
portray, on the tree-hierarchy portion, nodes representing users and groups having allocated storage corresponding to storage consumers that are members of different file systems having allocated storage capacity on a storage domain,
portray, on the table-portion, rows and one or more columns,
the one-or-more columns each representing an attribute, respectively, regarding an allotment of storage space to the respective storage consumers, and
each row being aligned with one of the nodes, respectively, and including cells corresponding to the one or more columns,
simultaneously portray on the table portion the allotment of storage space for storage consumers of the different file systems, and
toggle, in response to a user request, between the tree-table and a table view that shows the storage domain in a table that can be sorted based on attributes to which a column of the table belongs, wherein the storage domain includes a network-attached storage (NAS) device on which the two different file systems are mounted.

31. The apparatus of claim 30, wherein the attribute is one of:
a soft limit on storage space;
a hard limit on storage space; and
a currently-consumed amount of storage space.

32. The apparatus of claim 31, wherein:
the attribute is a first attribute;
the first attribute is the soft limit: and
the generation means is further operable to portray, on the table-portion, another column representing a second attribute, the second attribute being a size of a grace period in which the soft limit can exceeded.

33. The apparatus of claim 30, wherein the tree-table and the sortable table are synchronized.

* * * * *

UNITED STATES PATENT AND TRADEMARK OFFICE
CERTIFICATE OF CORRECTION

PATENT NO. : 7,509,589 B2 Page 1 of 1
APPLICATION NO. : 10/673834
DATED : March 24, 2009
INVENTOR(S) : Brian Scott Hallisey et al.

It is certified that error appears in the above-identified patent and that said Letters Patent is hereby corrected as shown below:

In column 4, line 60, delete "forth" and insert -- fourth --, therefor.

In column 8, line 53, in Claim 9, delete "colunm" and insert -- column --, therefor.

Signed and Sealed this

Sixteenth Day of November, 2010

David J. Kappos
*Director of the United States Patent and Trademark Office*